(12) United States Patent
Reed et al.

(10) Patent No.: US 9,341,920 B1
(45) Date of Patent: May 17, 2016

(54) PULSED FIBER LASER WAVELENGTH CONVERTOR

(71) Applicant: Gooch and Housego PLC, Ilminster, Somerset (GB)

(72) Inventors: Murray Keith Reed, Menlo Park, CA (US); Robert C. Eckardt, Mayfield Village, OH (US)

(73) Assignee: Gooch and Housego PLC, Somerset (GB)

( * ) Notice: Subject to any disclaimer, the term of this patent is extended or adjusted under 35 U.S.C. 154(b) by 0 days.

(21) Appl. No.: 14/616,362

(22) Filed: Feb. 6, 2015

(51) Int. Cl.
*G02F 1/39* (2006.01)
*G02F 1/35* (2006.01)
*G02F 1/365* (2006.01)
*H01S 3/00* (2006.01)
*G02B 27/10* (2006.01)

(52) U.S. Cl.
CPC ............. *G02F 1/3532* (2013.01); *G02F 1/365* (2013.01); *G02F 1/395* (2013.01); *H01S 3/0092* (2013.01); *G02B 27/1086* (2013.01); *G02F 2001/3528* (2013.01); *G02F 2001/392* (2013.01)

(58) Field of Classification Search
CPC ... G02F 1/39; G02F 1/3558; G02F 2001/392; G02F 2001/3548
USPC .................. 359/326–332; 372/21–22
See application file for complete search history.

(56) References Cited

U.S. PATENT DOCUMENTS

| 7,233,278 | B2 | 6/2007 | Eriksson | |
|---|---|---|---|---|
| 7,443,903 | B2 * | 10/2008 | Leonardo | B23K 26/067 372/97 |
| 8,369,003 | B2 * | 2/2013 | Lin | G02F 1/39 359/328 |
| 2012/0327960 | A1 | 12/2012 | Wise et al. | |

OTHER PUBLICATIONS

Mathieu Charbonneau-Lefort, et al., "Optical parametric amplifiers using chirped quasi-phase-matching gratings I: practical design formulas", J. Opt. Soc. Am. B, vol. 25, No. 4, Apr. 2008, pp. 463-480.
Alexander M. Heidt, et al., "Coherent octave spanning near-infrared and visible supercontinuum generation in all-normal dispersion photonic crystal fibers", Optics Express, vol. 19, No. 4, Feb. 14, 2011, pp. 3775-3787.
C.R. Phillips, et al., "Efficiency and phase of optical parametric amplification in chirped quasi-phase-matched gratings", Optics Letters, vol. 35, No. 18, Sep. 15, 2010, pp. 3093-3095.
Murray K. Reed, et al., "Microjoule-energy ultrafast optical parametric amplifiers", J. Opt. Soc. Am. B, vol. 12, No. 11, Nov. 1995, pp. 2229-2236.

* cited by examiner

*Primary Examiner* — Daniel Petkovsek
(74) *Attorney, Agent, or Firm* — Jetter & Associates, P.A.

(57) ABSTRACT

A wavelength convertor includes a beam splitter which splits a pulsed laser beam at wavelength $\lambda_p$ into a first higher power pulse portion and a second low power pulse portion. A fiber super continuum (SC) generator is coupled to receive the second pulse portion which converts the second pulse portion into a SC pulse having a bandwidth of >100 nm including a narrow spectral portion at wavelength $\lambda_s$. An optical parametric amplifier (OPA) having a periodically poled material is included with domains arranged to provided quasi-phase matching for amplification at $\lambda_s$ and pumping at $\lambda_p$. The arrival of the SC pulse portion at $\lambda_s$ and the first pulse portion at the OPA is synchronized to overlap in time. The OPA is seeded by the SC pulse portion at $\lambda_s$ and pumped by the first pulse portion to provide an amplified OPA seed at $\lambda_s$.

10 Claims, 6 Drawing Sheets

PULSED FIBER LASER WAVELENGTH CONVERTOR

FIELD

Disclosed embodiments relate to pulsed fiber laser wavelength convertors.

BACKGROUND

An optical parametric amplifier (OPA) is a laser-based light source that emits light tunable in wavelength generated by a nonlinear optical process. In this processes high-intensity laser output is converted to light of wavelengths (or equivalently frequencies) different from that of the laser using suitable nonlinear optical materials. The nonlinear materials are typically crystals that exhibit nonlinear optical properties. This process of wavelength conversion is dependent on the relative phases of the waves involved and without proper phase matching the converted light intensity oscillates at insignificant small levels. Phase matching typically can be obtained over a narrow spectral region, allowing conversion in that region to grow. The narrow spectral region of phase matching can be used for frequency selection. Introducing a low intensity pulse at the desired conversion frequency within the spectral bandwidth of phase matching and synchronized to the pump pulse is referred to as "seeding". Seeding improves the spectral and spatial quality of the tunable light generated in the conversion process.

Three pulses or waves present in an OPA are called the pump, signal and idler. The pump pulse is typically the output of a laser. The pump, at frequency $\omega_p$, provides energy for amplification of the signal and generation of an idler pulse. The signal and idler frequencies are less than that of the pump and are called $\omega_s$ and $\omega_i$ respectively. The relationship $\omega_p = \omega_s + \omega_i$ holds between the three frequencies. This process can be thought of as one photon of an incident laser pulse (pump) being divided into two lower-energy photons (signal and idler) by a nonlinear optical crystal. The relationship of frequencies can also be expressed in terms of the free-space wavelengths of the pump, signal and idler as $1/\lambda_p = 1/\lambda_s + 1/\lambda_i$.

An OPA has incident light at the signal frequency called the seed along with the higher intensity pump light. An optical parametric generator (OPG) has only incident pump light and no incident seed. The signal and idler grow from random background fluctuations in an OPG. The output beams of an OPG are usually relatively weak and are relatively spread-out in direction and frequency. Some spectral narrowing and reduced divergence can be obtained by using optical parametric amplification following an OPG. If the purpose of the wavelength conversion is the generation of idler light from input of incident pump and signal light, the process may be called difference frequency generation.

The wavelengths of the signal and the idler waves are determined by the phase matching condition, which can be changed by temperature or, in bulk birefringent nonlinear crystals by the angle between the incident pump laser ray and the optical axes of the crystal. In a method called quasi-phase matching (QPM), the orientation of the nonlinear crystal is changed after each coherence length so that the sign of the effective nonlinear coefficient is reversed. A coherence length is the distance over which energy conversion flows from the pump to the signal and idler in a uniform nonlinear crystal. Back conversion occurs as the propagation distance exceeds the coherence length, and signal and idler energies are converted back to pump energy. Changing the sign of the nonlinear coefficient after each domain that is of a length that is an odd-integer multiple of the coherence length allows the conversion of pump to signal and idler to continue. The coherence length is determined by the three OPA wavelengths and dispersion of the nonlinear material. A domain is a region of uniform crystal orientation. A quasi-phase-matching period comprises two domains of alternating crystal orientation.

Periodically poled lithium niobate (PPLN) is an example of a quasi-phase-matched nonlinear material. The period of the poling is usually two coherence lengths, a domain of one coherence length followed by a second domain of inverted orientation also of one coherence length. This structure is repeated periodically throughout the length of the quasi-phase-matched material. Typical periods for the wavelengths of examples presented in this Disclosure are approximately 30 microns. The QPM period determines the wavelengths of phase matching on large or coarse scale, and temperature tuning is commonly used to finely adjust the wavelengths of phase matching. The QPM period can also be slowly increased or decreased (chirped) over the length of the crystal. Chirped QPM has been shown to be useful with ultrashort optical pulses when differences in group velocity cause different spectral components of the pulses to overlap at different positions in the nonlinear crystal.

Group velocities describe the propagation speed of the individual pulses, and differ significantly for the pump, signal, and idler ultrashort pulses. Group velocity is determined by dispersion of an optical material. With ultrashort pulses, normal differences in group velocity can cause the signal or the idler pulse to completely propagate through a pump pulse in millimeter crystal lengths. Propagation paths with dispersion controlled by prisms or optical gratings are commonly used to expand ultra short pulses to longer pulses with a frequency chirp or compress frequency-chirped longer pulses to shorter pulses with no frequency chirp. With the use of ultra-short pulses or expanded pulses with frequency chirp, synchronization of a seed pulse with the pump pulse in an OPA is important.

Photonic crystal fibers (PCFs) have a regular structure that is constant over the length of the fiber. An example referenced herein is a silica glass fiber with an array of circular voids arranged in a hexagonal pattern with the central void absent. An all normal dispersion (ANDi) fiber has group velocity only increasing with increasing wavelength in the spectral region of concern. Structure in a wave such as modulation propagates with the group velocity. Dispersion in an optical fiber is determined both by the bulk dispersion of the material from which the fiber is made and the structure of the fiber. The diameter and spacing of the voids contribute to the dispersive properties of the fiber.

A super continuum (SC) pulse is generated by the action of a nonlinear index of refraction and group velocity dispersion. As pulse intensity increases the nonlinear index increases causing slower propagation. The leading slope of the pulse with increasing intensity is expanded in time and the trailing slope of the pulse is compressed in time. The local wavelength is increased in the leading slope and decrease on the trailing slope in a process called self-phase modulation (SPM). With normal group velocity dispersion the leading-slope, longer-wavelength portion propagates faster, and the trailing-slope, shorter-wavelength portion propagates more slowly. Wavelength-shifted light in the slopes of a pulse can be advanced or delayed to overlap un-shifted light in the tails of the pulse. In an effect called optical wave breaking (OWB) the overlapping pulse portions of different wavelength interact to produce wavelength side bands further broadening the pulse. The result is a SC pulse expanded in wavelength and time.

SUMMARY

This Summary is provided to introduce a brief selection of disclosed concepts in a simplified form that are further described below in the Detailed Description including the drawings provided. This Summary is not intended to limit the claimed subject matter's scope.

Disclosed wavelength convertors comprise a pulsed fiber laser that outputs laser pulses at wavelength $\lambda_p$ that are split (e.g., by a grating, mirror, or fiber coupler) into a first higher power pulse portion and a second lower power pulse portion. The second pulse portion is used as an input to fiber super continuum (SC) generator for converting the second pulse portion into a SC pulse having a broader spectral distribution and deterministic amplitude and phase relationship relative to the laser pulse. The resulting super continuum output is highly coherent (i.e., well-defined and reproducible amplitude and phase from pulse-to-pulse) having a bandwidth of at least 100 nm including a narrow spectral portion at a desired wavelength $\lambda_s$ (SC pulse portion at $\lambda_s$).

The first pulse portion is used to pump an OPA having a periodically poled nonlinear optical material. The domains of alternating crystal orientation of this material each have length that is an odd-integer multiple of the coherence length for the desired process. Two domains of alternating crystal orientation form one period. This structure is periodically repeated over the length of the OPA crystal to provide quasi-phase matching at the selected wavelengths. The OPA is seeded by the narrow SC pulse portion at $\lambda_s$ which may be referred to as a seed pulse. By focusing the beams associated with the pump pulse and seed pulse together in space and bringing the pulses together in time in an appropriately patterned OPA crystal material, the pump power is efficiently converted into amplified seed power at wavelength $\lambda_s$. Periodically poled lithium niobate is used as the OPA crystal material in the examples below because it has attractive characteristics and is readily available. However, other nonlinear optical materials can also be used as the OPA crystal material. Disclosed wavelength convertors realize an optical source which is not restricted in wavelength to be that of the fiber laser supplying the pump light at $\lambda_p$.

There is a precise temporal and phase relationship between the seed pulse and the incident pump pulse. Controlled propagation distances bring the seed pulse and the pump pulse into synchronization when incident on the OPA crystal. Only the desired portion of the seed pulse will be amplified. In this parametric process the pump pulses and the seed pulses propagate together. For a portion of the seed pulse to be amplified the seed pulse should coincide with the pump pulse and be at a wavelength for which quasi-phase matching exists. Periodical poling provides flexibility in phase matching allowing both uniform periods and chirped periods to match chirped frequencies in the seed and pump pulses.

BRIEF DESCRIPTION OF THE DRAWINGS

Reference will now be made to the accompanying drawings, which are not necessarily drawn to scale, wherein.

DETAILED DESCRIPTION

Example embodiments are described with reference to the drawings, wherein like reference numerals are used to designate similar or equivalent elements. Illustrated ordering of acts or events should not be considered as limiting, as some acts or events may occur in different order and/or concurrently with other acts or events. Furthermore, some illustrated acts or events may not be required to implement a methodology in accordance with this disclosure.

Notwithstanding that the numerical ranges and parameters setting forth the broad scope of this Disclosure are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5.

Figure 1:
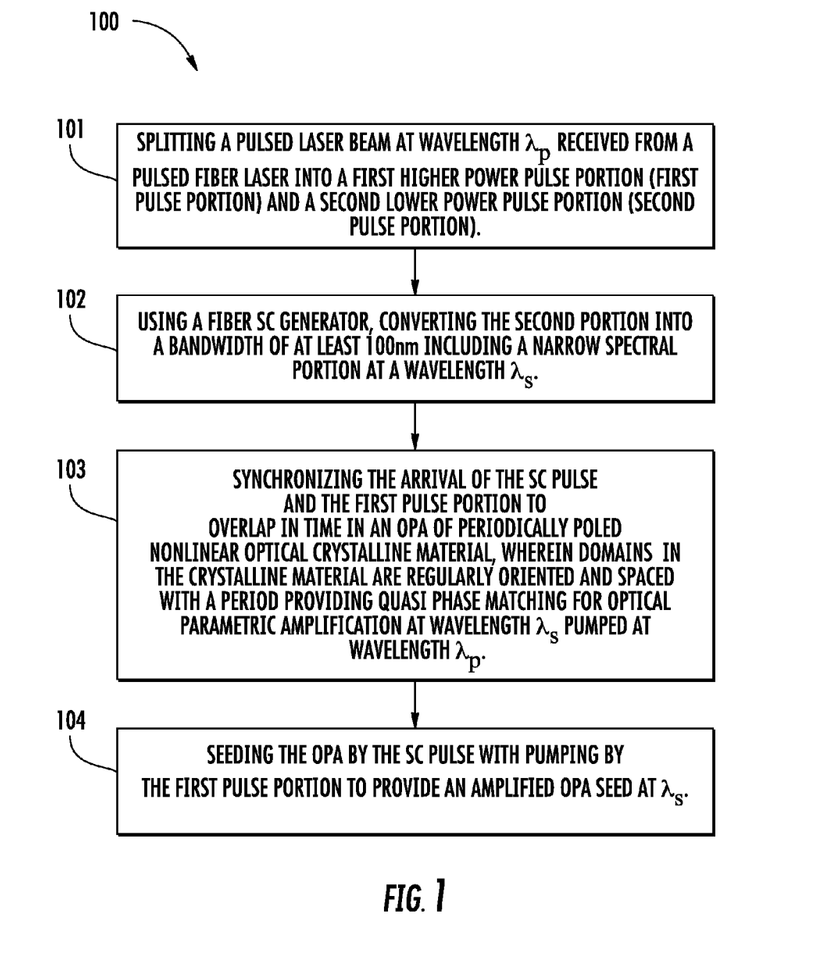
FIG. 1 is a flow chart that shows steps in an example method of wavelength conversion using a fiber SC generator for generating a seed and an OPA for amplifying the seed, according to an example embodiment.

FIG. 1 is a flow chart that shows steps in an example method 100 of wavelength conversion using a fiber SC generator for generating a seed and an OPA for amplifying the seed with a pump pulse, according to an example embodiment. Step 101 comprises splitting a pulsed laser beam at a wavelength $\lambda_p$ received from a pulsed fiber laser source (e.g., ultrafast (10 fs to 10 ps) pulse length, 10 nJ to 10 µJ in pulse energy) into a first higher power pulse portion (first pulse portion) and a second lower power pulse portion (second pulse portion). A typical range for the power splitting ratio is 90% to 95% for the first pulse portion and the remaining 5% to 10% of power for the second pulse portion.

Step 102 comprises using a fiber SC generator converting the second portion into a bandwidth of at least 100 nm including a narrow spectral portion at a wavelength $\lambda_s$ (SC pulse portion at $\lambda_s$). The fiber SC generator can comprise an all-normal-dispersion photonic crystal fiber (ANDi PCF), such as the octave-spanning ANDi PCF disclosed in a paper by Heidt et al. entitled "Coherent octave spanning near-infrared and visible super continuum generation in all-normal dispersion photonic crystal fibers" which is incorporated by reference herein. An octave is a factor of 2. A significant benefit of SC generation in an ANDi PCF is the conservation of a single ultrashort pulse in the time domain with a smooth and compressible phase distribution characterized by a simple temporal profile, low pulse-to-pulse variations in intensity and phase as well as minimal fine structures over its bandwidth. In the process of SC generation the incident pulse is lengthened in time and given a frequency chirp that far exceeds the original frequency content of the pulse. Pulse compression in time is possible with dispersion controlled by prisms or reflective gratings in the propagation path.

Other fiber SC generators for converting the second pulse portion into a low noise SC pulse including a narrow spectral portion at a wavelength $\lambda_s$ may also be used, such as a photonic nanowire, or a tapered-suspended core PCF. (See, e.g., Heidt et al. entitled "Deep ultraviolet super continuum generation in optical nanofibers by femtosecond pulses at 400 nm wavelength" Proc. SPIE 7714, 771407-771409 (2010)).

Figure 2A:
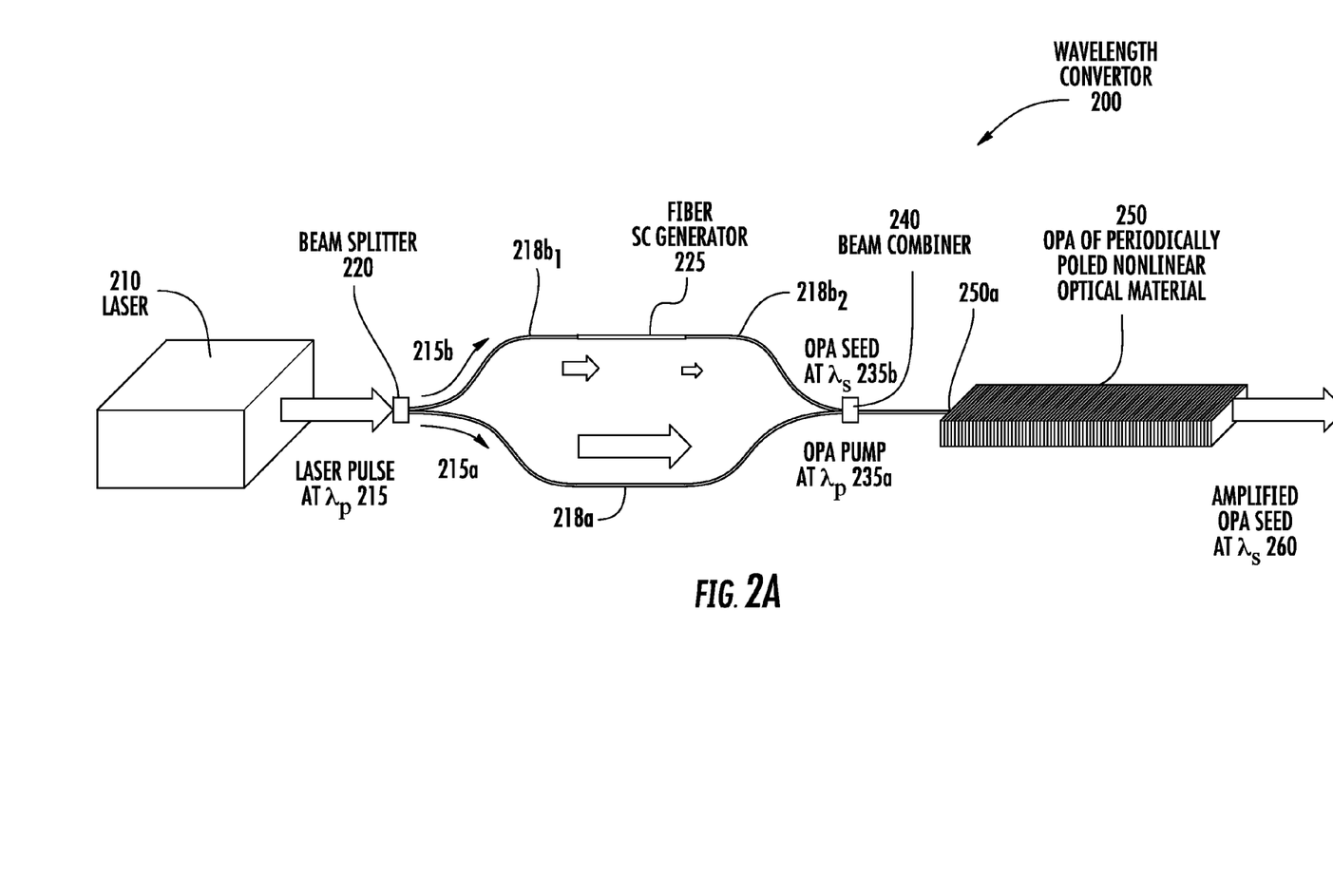
FIG. 2A shows an example pulsed fiber laser wavelength convertor (wavelength convertor), according to an example embodiment.

Step 103 comprises synchronizing the arrival of the SC pulse portion at wavelength $\lambda_s$ shown as 235b in FIG. 2A output by the fiber SC generator 225 and the first pulse portion at $\lambda_p$ shown as OPA pump at $\lambda_p$ 235a in FIG. 2A to arrive at essentially the same time to overlap in time in an OPA of periodically poled nonlinear optical material (shown as OPA 250 in FIG. 2A). The domains in the nonlinear crystalline material of the OPA 250 are regularly oriented and spaced with a period to provide quasi-phase matching for the wavelengths, $1/\lambda_p=1/\lambda_s+1/\lambda_i$, of the OPA process. The synchronizing of the arrivals can comprise precise control of fiber lengths or adjusting an adjustable free space path in a path of the SC pulse portion at $\lambda_s$ and an adjusting an adjustable free space path in a path of the OPA pump at $\lambda_p$. Step 104 comprises seeding the OPA 250 by the SC pulse portion at wavelength $\lambda_s$ with pumping by the first pulse portion at wavelength $\lambda_p$ to provide an amplified OPA seed at wavelength $\lambda_s$ 260.

A slab of periodically poled nonlinear optical material such as MgO doped PPLN can be used for the OPA 250. A "periodically poled material" as used herein refers to a nonlinear optical material having domains with alternate orientation, where the domains are regularly spaced, with domain lengths of an odd-integer multiple of the coherence length for the desired wavelengths of operation. The poled structure is configured to achieve quasi-phase-matching (QPM) in the material. Besides LN, other commonly used periodically poled materials include potassium titanyl phosphate (KTP), MgO, and lithium tantalate.

Using the example of PPLN, a $\lambda_p$ of 1.04 µm, $\lambda_s$ and $\lambda_i$ of 1.35 µm and 4.35 µm respectively, the poling period used is 26.34 µm for operation at 100° C. This corresponds to a coherence length of 13.17 µm. Such poling periods are generally available on special order from commercial vendors. PPLN crystals are frequently obtained with adjacent areas of periods differing by a small amount, such as 0.25 µm. Using adjacent areas provides a large step in wavelength tuning of phase matching. Temperature tuning is then used to provide continuous fine tuning of phase-matching tuning. Chirped PPLN crystals with slowly changing period are also available by standard fabrication techniques.

The synchronization of the OPA seed at $\lambda_s$ pulses 235b and OPA pump at $\lambda_p$ pulses 235a is important to the wavelength conversion process. Different wavelength components of the OPA seed at $\lambda_s$ 235b output by the fiber SC generator 225 shown in FIGS. 2A and 2B described below will arrive at different times. Amplification of specific seed wavelength(s) involves maximizing the temporal overlap of those seed wavelengths and the OPA pump at $\lambda_p$ pulses 235a in the portion of the OPA QPM crystal that has the correct period to produce gain for those seed wavelength(s). The OPA seed at $\lambda_s$ 235b has a chirped range of wavelengths spread out in time to select from, the OPA pump at $\lambda_p$ pulses 235a have an extended time, the OPA crystal of the OPA 250 can have a range of periods spread out in space and has strong temperature dependence, and the OPA seed at $\lambda_s$ pulses 235b and the OPA pump at $\lambda_p$ pulses 235a travel at different speeds in the OPA crystal. Tuning the relative timing of the respective pulses, the pulse lengths, the frequency chirps of the OPA pump at $\lambda_p$ and the OPA seed at $\lambda_s$, the chirp of the QPM period of the OPA crystal, and the OPA crystal temperature are all generally needed. The OPA crystal temperature is typically stabilized to 0.1° C. in QPM applications.

The adjustment of the relative timing of the seed pulses (OPA seed at $\lambda_s$ 235b) and the pump pulses (OPA pump at $\lambda_p$ 235a) can be achieved in free-space propagation by movement of optical components to change path length of each beam. In free space light travels 3 µm in 10 fs. Mechanical adjustments to a fraction of this length are possible and will generally be utilized. Propagation time in the optical fibers used to transmit the pump pulse (OPA pump at $\lambda_p$ 235a) and seed pulse (OPA seed at $\lambda_s$ 235b) will generally be fixed. The fiber lengths will generally be selected to bring the pulses close to synchronization allowing free-space adjustment to achieve the needed timing, which can optionally include the adjustable paths 230a and 230b described below relative to FIG. 2B.

FIG. 2A is a depiction of an example pulsed fiber laser wavelength convertor (wavelength convertor) 200, according to an example embodiment. Wavelength convertor 200 includes a narrowband pulsed fiber laser (fiber laser) 210 which generates laser pulses at a wavelength $\lambda_p$ (laser pulses at $\lambda_p$) 215. Fiber laser 210 is generally an ultra-fast laser providing output pulse durations of 10 fs to 10 ps, and a pulse energy of 10 nJ to 10 µJ. The fiber laser 210 can comprise a commercially available fiber laser, such as providing operating free-space wavelengths around atomically derived laser lines 1040 nm (Yb), 1550 nm (Er) or 1990 nm (Th). The fiber laser 210 is chosen to provide a pump for the OPA 250 and for SC generation.

The laser output pulse at wavelength $\lambda_p$ 215 generated by fiber laser 210 is shown coupled to a beam splitter 220, such as a fiber coupler, mirror, or grating, for splitting the laser pulse at $\lambda_p$ 215 input into two parts, including a first pulse portion 215a which comprises most of the laser pulse, which remains at wavelength $\lambda_p$, that is transmitted by optical fiber 218a and used as the high power pump for the OPA 250, and a second pulse portion 215b that is generated by taking a small portion (e.g., 5% to 10%) of the laser pulse at $\lambda_p$ 215. The second pulse portion 215b is transmitted by optical fiber 218b₁ and used as input to fiber SC generator 225.

An all normal dispersion (ANDi) photonic crystal fiber (PCF) can be used for the SC generator 225 in one example. The OPA seed at $\lambda_s$ 235b selected from the SC output provided by the fiber SC generator 225 is used as the seed for the OPA 250 due to its synchronized time of arrival at the OPA 250 with the OPA pump at $\lambda_p$ 235a. The SC generator 225 and the second pulse portion 215b are configured to produce a SC of at least 100-nm bandwidth containing a component at the desired seed wavelength $\lambda_s$ (seed pulse at wavelength $\lambda_s$ 235b). At some point, such as after the SC generator 225, one can insert a variable delay to provide synchronization in time between the SC pulse portion at wavelength $\lambda_s$ and the first pump pulse portion 215a (see adjustable paths 230a and 230b shown in FIG. 2B described below).

An optical fiber 218a is shown to bringing the first pulse portion 215a to a beam combiner 240. At this point the first pulse portion 215a may have changed characteristics due to dispersion in the optical fiber 218a which is identified as OPA pump at $\lambda_P$ in 235a in FIG. 1A and FIG. 2B. As noted above, optical fiber $218b_1$ is for bringing second pulse portion 215b to the fiber SC generator 225 and an optical fiber $218b_2$ is shown for bringing the OPA seed at $\lambda_s$ 235b provided by fiber SC generator 225 to the beam combiner 240. The beam combiner 240 can comprise a fiber coupler, mirror, or grating. The combined OPA pump at $\lambda_p$ 235a and OPA seed at $\lambda_s$ 235b become the input 250a to the OPA 250. The OPA 250 output includes an amplified OPA seed at $\lambda_s$ 260.

Figure 2B:
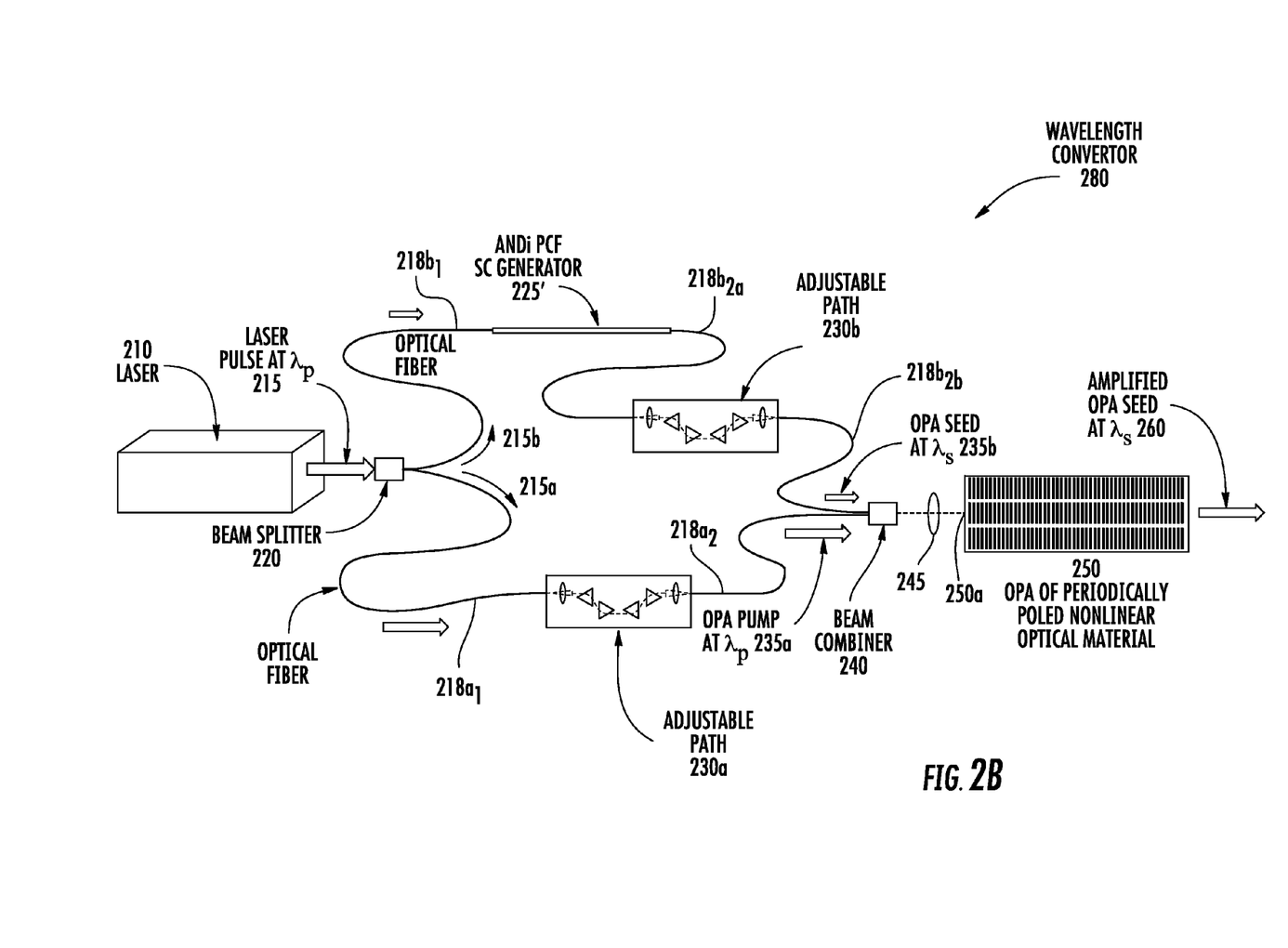
FIG. 2B shows another example pulsed fiber laser wavelength convertor (wavelength convertor), according to an example embodiment.

FIG. 2B is a depiction of another example pulsed fiber laser wavelength convertor (wavelength convertor) 280, according to an example embodiment. The fiber SC generator is shown as an ANDi PCF SC generator 225'. There is also shown an optional adjustable path 230a between the beam splitter 220 and the beam combiner 240 in the pump path splitting the optical fiber 218a shown in FIG. 2A into first fiber $218a_1$ and second fiber $218a_2$, and an optional adjustable path 230b in the seed path between the ANDi PCF SC generator 225' and the beam combiner 240 splitting the optical fiber $218b_2$ shown in FIG. 2A into first fiber $218b_{2a}$ and second fiber $218b_{2b}$ in FIG. 2B. The adjustable paths can comprise coupling lenses and dispersive prisms. There is also shown a lens 245 between the beam combiner 240 and the OPA 250.

EXAMPLES

Disclosed embodiments are further illustrated by the following specific Examples, which should not be construed as limiting the scope or content of this Disclosure in any way.

The examples presented here are obtained from numerical modeling. The model included the temporal distributions tracking phase and dispersion and spatial distributions tracking divergence and diffraction. The phase-dependent nonlinear interaction with conversion to the signal and idler with pump depletion and back conversion is included in the calculations. Confidence in the model was gained by duplication of published experimental results.

A variety of conditions are disclosed in the examples below. The examples start with a time-bandwidth-limited laser output pulse of 100-fs full width at half maximum. Such a pulse has a Gaussian temporal pulse shape and no frequency chirp or other modulation. Diffraction-limited Gaussian transverse spatial distributions are also used for propagation in the periodically poled nonlinear material. Wavelength convertor 280 shown in FIG. 2B was used for the experiments performed which includes an adjustable dispersive path 230a for the pump pulse and an adjustable dispersive path 230b for the SC pulse from which the seed was extracted. This provides for independent control of the duration and frequency chirp of the pump and seed pulses incident on the OPA crystal of the OPA 250.

The example of amplification of a 1350-nm seed pulse and a 1040-nm laser output in pulses of 100-fs duration and 100-nJ energy was used. In this application an idler pulse of 4529-nm (4.529 µm) wavelength was generated. There is an unusual problem for amplification in PPLN for this case. Due to an inflection in dispersion, the group velocity for the 4529-nm idler is less than either the group velocity of the 1040-nm pump or that of the 1359-nm signal. Values are tabulated in the table below for congruent $LiNbO_3$ for the OPA 250.

| wavelength | group velocity $v_g = 1/(dk/d\omega)$ (cm/s) | group velocity dispersion $\frac{d}{d\lambda}\left(\frac{1}{v_g}\right)$ (fs/{nm·cm}) |
|---|---|---|
| 1040 nm | $1.351 \times 10^{10}$ | −4.42 |
| 1350 nm | $1.367 \times 10^{10}$ | −1.61 |
| 4529 nm | $1.317 \times 10^{10}$ | +2.43 |

In this example, the OPA 250 comprised a PPLN grating that was 2.5-cm long of period 26.34 µm with no grating chirp used. The seed signal pulse (SC pulse portion at $\lambda_s$ 215b), was given a pulse duration and negative frequency chirp that would result in compression to a 100-fs pulse with no chirp after propagating through 2.5 cm of $LiNbO_3$ with no pump present. The pump pulse (first pulse portion 215a) was expanded to nearly 2-ps duration and acquired a positive frequency chirp in expansion. Chirp of the incident pulses is tabulated both as the rate of frequency change ((radians per second)/per second) and as the wavelengths at the leading half power point and wavelength at the trailing half power point. The spot size specified the transverse beam size.

| scheme: positive chirp pump, nearly compressed signal, initial pulses Gaussian in time | | | | |
|---|---|---|---|---|
| | leading | center | trailing | |
| signal (nm) | 1336.7 | 1350.0 | 1363.5 | No PPLN grating chirp period = 26.343 µm |
| pump (nm) | 1048.0 | 1040.0 | 1032.1 | |
| | pulse width | chirp (rad/s2) | position (s) | incident energy | spot size |
| signal | 147 fs | −1.382E+26 | 7.04E−14 | 0.01 nJ | 46.5 µm |
| pump | 1.965 ps | 1.212E+25 | −1.00E−12 | 100 nJ | 40 µm |

Figure 3A:
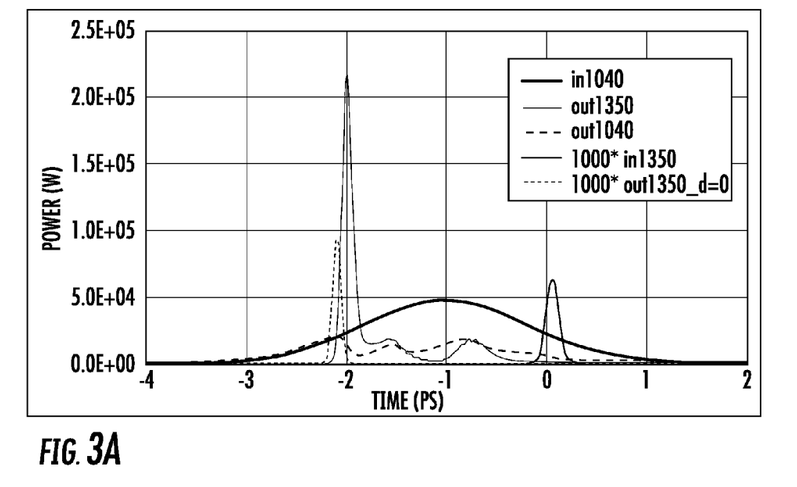
FIG. 3A is a graphic presentation of calculated results showing amplified seed (out1350) and depleted pump (out1040) at the output of the OPA, according to an example embodiment.

FIG. 3A is a graphic presentation of calculated results showing amplified seed (out1350) and depleted pump (out1040) at the output of the OPA, according to an example embodiment. Reduced time of the group velocity of an undepleted pump (in ps) is used as the abscissa in FIG. 3A. Also shown are the incident pump (in1040) and incident signal seed (1000*in1350) and the seed as it would appear at the output of the OPA if there was no pumping (1000*out1350_d=0). The size of the incident seed and exiting seed with no pumping are increased by a factor of 1,000 to make them visible on this scale. All pulses are shown in the reduced time of an undepleted pump pulse.

With pumping, there is shown 59% depletion of the pump energy with 45% conversion to amplified signal energy. The central spike of the amplified signal has 0.12-ps FWHM and 0.26-ps width at 10% of peak power. The fraction of amplified signal energy within the FWHM is 32% and there is 61% of the signal energy between the 10% points. The peak intensity of the undepleted pump at the beam waist at the center of the PPLN crystal is about 2 $GW/cm^2$. The slower propagating idler walks off back through the pump.

Figure 3B:
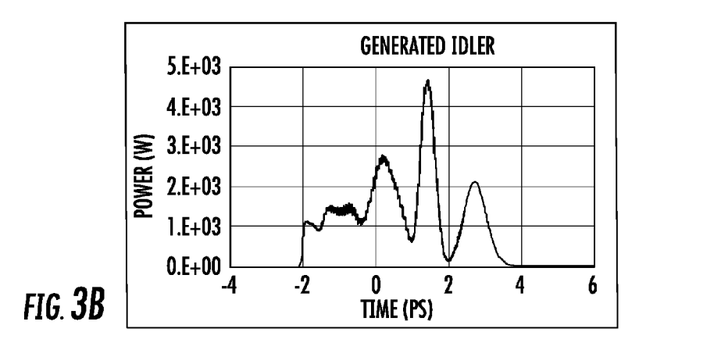
FIG. 3B is a graphic presentation of the calculated idler pulse in the reduced time of an undepleted pump pulse, according to an example embodiment.
Figure 3C:
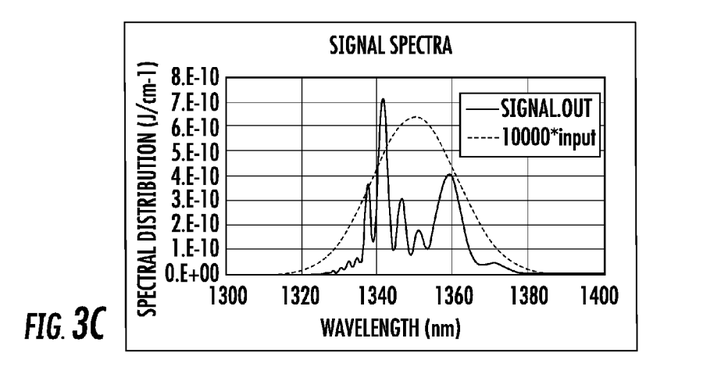
FIG. 3C shows spectral energy distributions of an incident signal seed pulse and amplified pulse, according to an example embodiment.
Figure 3D:
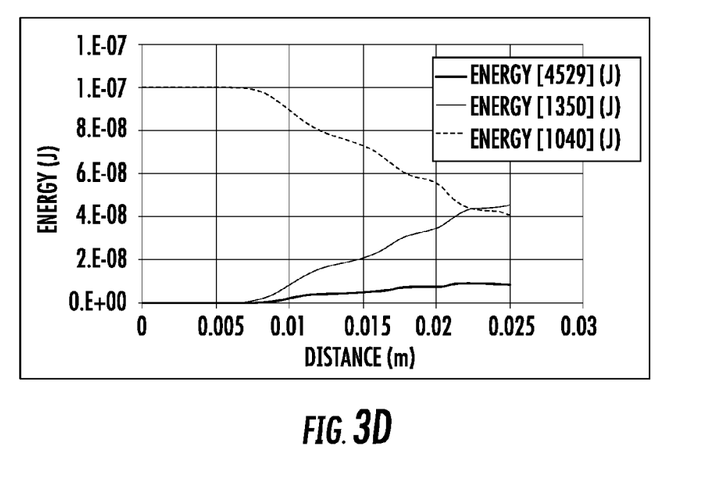
FIG. 3D shows transfer of energy from pump pulse to signal pulse and idler pulse as a function of propagation distance through a 2.5-cm-long OPA crystal, according to an example embodiment.

FIG. 3B is a graphic presentation of the calculated idler pulse in the reduced time of an undepleted pump pulse. The idler pulse is spread out in time after the amplified signal seed. The complicated idler pulse shape is caused by the slower group velocity of the idler and the nonlinear interaction of the idler pulse with the incompletely depleted pump pulse. FIG. 3C shows the spectral energy distributions of incident signal seed pulse and amplified pulse. The incident pulse spectrum is increased by a factor of 10,000 to make it visible on the same scale as that of the amplified pulse. FIG. 3D shows the transfer of energy from pump pulse to signal pulse and idler pulse as a function of propagation distance through a 2.5-cm-long OPA crystal.

The amplification process takes some distance to build up to significant power levels. Preamplification of the signal would add some complication but can offer some advantages. In an ideal situation the signal amplification would completely deplete the pump leaving nothing with which the slower propagating idler could interact.

Calculations using a chirped pump pulse expanded in time and a nearly compressed signal seed in a 2.5-cm long PPLN crystal with a chirped grating period and large spot size illustrate a low gain situation. This system was probed by using a 0.5-ps signal seed with no chirp. Several calculations were performed with various seed wavelengths. A pump beam spot size of 100 μm and corresponding signal seed size were used. Optical parametric amplification starts in roughly the expected positions, but gain is small. Gain is low because the length over which each process is quasi-phase matched is short and the beam spot sizes are large. In this case, it was found increasing the OPA gain led to problems of instability. Chirped PPLN gratings can have an advantage with another choice of wavelengths.

| scheme: positive chirp pump, nearly compressed signal, chirped PPLN | | | | | | |
|---|---|---|---|---|---|---|
| signal (nm) | incident | center | exit | PPLN grating chirp | | |
| | various wavelengths to probe gain | | | | | |
| pump (nm) PPLN period | 1032.1 | 1040.0 | 1048.0 | incident 26.99 μm | center 26.34 μm | exit 25.51 μm |
| | FWHM | shape | chirp (rad/s$^2$) | position | incident energy | spot size |
| signal | 500 fs | Gaussian | 0 | 53 fs | 0.01 nJ | 116.2 μm |
| pump | 2.288 ps | top hat | 1.212E+25 | −1.00 ps | 100 nJ | 100 μm |

Figure 4:
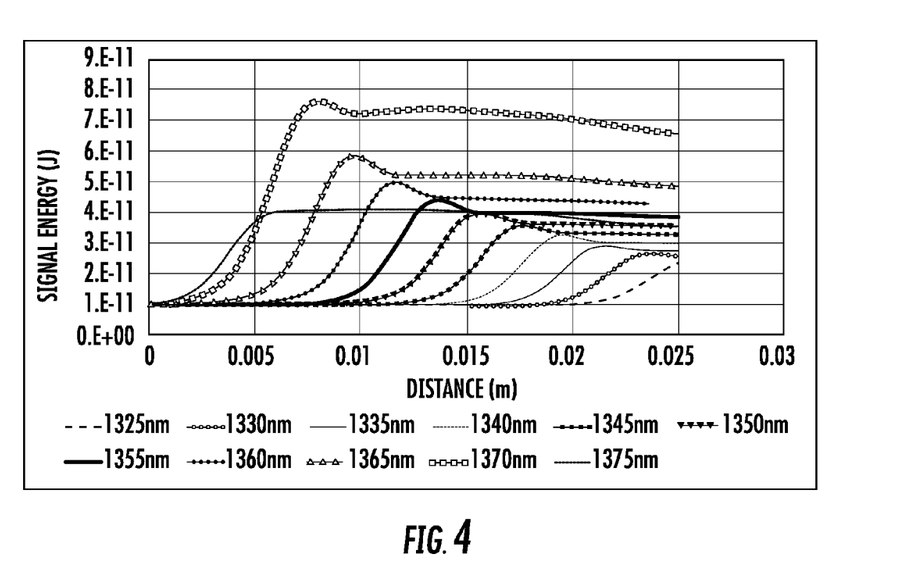
FIG. 4 shows OPA gain as a function of position at low pump powers in a chirped grating periodically poled lithium niobate (PPLN) crystal, according to an example embodiment.

FIG. 4 shows OPA gain as a function of position at low pump powers in a chirped grating PPLN crystal.

Another example of a fully compressed pump and a fully compressed signal seed incident on a short, 5-mm-long PPLN crystal with a constant period is presented in the table below.

| scheme: fully compressed signal and pump constant period PPLN 26.34 microns 5-mm long | | | | | |
|---|---|---|---|---|---|
| | FWHM | shape | chirp (rad/s) | position | incident energy | spot size |
| signal seed | 100 fs | Gaussian | 0 | 215 fs | 0.01 nJ | 46.5 μm |
| pump | 100 fs | Gaussian | 0 | 0 | 100 nJ | 40 μm |

Figure 5A:
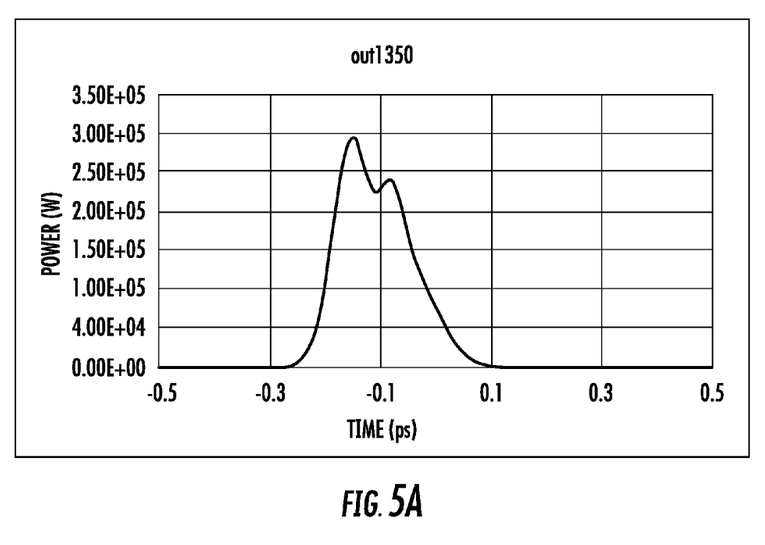
FIGS. 5A and 5B show an amplified signal pulse and an amplified signal spectrum, respectively, according to an example embodiment.
Figure 5B:
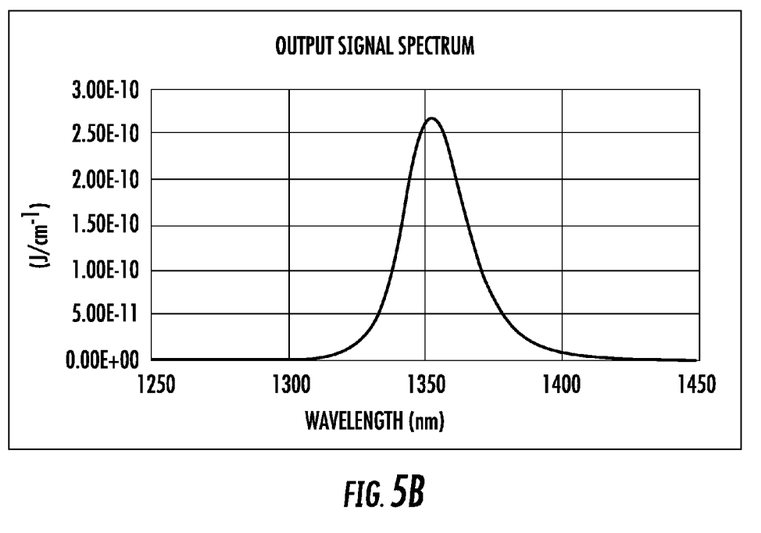

FIGS. 5A and 5B show an amplified signal pulse and an amplified signal spectrum, respectively, according to an example embodiment. The total signal output energy is 45 nJ with a 100-nJ pump incident. The feed back due to the more slowly propagating idler dominates in all of these calculations. A two stage OPA scheme with short un-chirped PPLN crystals, fully compressed pump and signal seed, and a dispersive delay between the crystal to again place the pump ahead of the signal and eliminate the idler before the second crystal gave good results.

Those skilled in the art to which this disclosure relates will appreciate that many other embodiments and variations of embodiments are possible within the scope of the claimed invention, and further additions, deletions, substitutions and modifications may be made to the described embodiments without departing from the scope of this disclosure.

Thus, the breadth and scope of the subject matter provided in this Disclosure should not be limited by any of the above explicitly described embodiments. Rather, the scope of this Disclosure should be defined in accordance with the following claims and their equivalents.

The invention claimed is:

1. A wavelength convertor, comprising:
a pulsed laser source providing a pulsed laser beam at a wavelength $\lambda_p$;
a beam splitter for splitting said pulsed laser beam into a first higher power pulse portion and a second lower power pulse portion;
a fiber super continuum (SC) generator providing an output deterministic in amplitude and phase relationship relative to said pulsed laser beam coupled to receive said second pulse portion for converting said second pulse portion into a SC pulse having a bandwidth of at least 100 nm including a narrow spectral portion at a wavelength $\lambda_s$,
a beam combiner for combining said first pulse portion with said SC pulse, and
an optical parametric amplifier (OPA) comprising a periodically poled nonlinear optical crystalline material, wherein domains in said crystalline material are regularly oriented and spaced with a period providing quasi-phase matching,
wherein an arrival of said SC pulse and said first pulse portion at said OPA is synchronized to overlap in time with one another so that said OPA is seeded by said SC pulse and pumped by said first pulse portion to provide an amplified OPA seed at $\lambda_s$.

2. The wavelength convertor of claim 1, wherein said pulsed laser beam has a pulse length from 10 fs to 10 ps and a pulse energy from 10 nJ to 10 μJ.

3. The wavelength convertor of claim 1, wherein said fiber SC generator comprises an All Normal Dispersion (ANDi) photonic crystal fiber (PCF), photonic nanowire, or tapered-suspended core (PCF).

4. The wavelength convertor of claim 1, wherein said fiber SC generator comprises an All Normal Dispersion (ANDi) photonic crystal fiber (PCF), and wherein said SC pulse provides said bandwidth of at least an octave.

5. The wavelength convertor of claim 1, wherein said beam splitter comprises a first fiber coupler.

6. The wavelength convertor of claim 1, wherein a first mirror or a first grating is used for said splitting and wherein a second mirror or a second grating is used as said beam combiner.

7. The wavelength convertor of claim 1, wherein said crystalline material comprises lithium niobate (LN).

8. The wavelength convertor of claim 1, further comprising an adjustable propagation path in a path of said SC pulse and an adjustable propagation path in a path of said first pulse portion.

9. A wavelength convertor, comprising:
- a pulsed laser source providing a pulsed laser beam at a wavelength $\lambda_p$;
- a beam splitter for splitting said pulsed laser beam into a first higher power pulse portion and a second lower power pulse portion;
- a super continuum (SC) fiber generator comprising an All Normal Dispersion (ANDi) photonic crystal fiber (PCF) for providing a deterministic amplitude and phase relationship relative to said pulsed laser beam coupled to receive said second pulse portion for converting said second pulse portion into a SC pulse having a bandwidth of at least an octave including a narrow spectral portion at a wavelength $\lambda_s$,
- an adjustable propagation path in a path of said SC pulse and an adjustable propagation path in a path of said first pulse portion,
- a beam combiner for combining said first pulse portion with said SC pulse, and
- an optical parametric amplifier (OPA) comprising a periodically poled nonlinear optical crystalline material, wherein domains in said crystalline material are regularly oriented and spaced with a period providing quasi-phase matching,
- wherein an arrival of said SC pulse and said first pulse portion at said OPA is synchronized to overlap in time with one another so that said OPA is seeded by said SC pulse and pumped by said first pulse portion to provide an amplified OPA seed at $\lambda_s$.

10. The wavelength convertor of claim 9, wherein said crystalline material comprises lithium niobate (LN).

* * * * *